US009864742B2

(12) United States Patent
Chen et al.

(10) Patent No.: US 9,864,742 B2
(45) Date of Patent: *Jan. 9, 2018

(54) PERSONA MANAGEMENT SYSTEM FOR COMMUNICATIONS

(71) Applicant: International Business Machines Corporation, Armonk, NY (US)

(72) Inventors: Li Chen, Cary, NC (US); Yongcheng Li, Cary, NC (US); Govindaraj Sampathkumar, Cary, NC (US); Ryan Urquhart, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 8 days.

This patent is subject to a terminal disclaimer.

(21) Appl. No.: 14/825,936

(22) Filed: Aug. 13, 2015

(65) Prior Publication Data
US 2015/0347391 A1 Dec. 3, 2015

Related U.S. Application Data

(63) Continuation of application No. 12/137,346, filed on Jun. 11, 2008, now Pat. No. 9,141,689.

(51) Int. Cl.
*G06F 7/00* (2006.01)
*G06F 17/30* (2006.01)
(Continued)

(52) U.S. Cl.
CPC ........ *G06F 17/2765* (2013.01); *G06F 17/274* (2013.01); *G06F 17/275* (2013.01);
(Continued)

(58) Field of Classification Search
CPC ............ G06F 17/30684; G06F 17/274; G06F 17/275; G06F 17/2765; H04L 67/306; H04L 51/046
(Continued)

(56) References Cited

U.S. PATENT DOCUMENTS 5,812,126 A * 9/1998 Richardson ........... G06F 17/274 704/2
6,377,965 B1 4/2002 Hachamovitch et al.
(Continued)

FOREIGN PATENT DOCUMENTS

JP 2000076225 3/2000

OTHER PUBLICATIONS

"Welcome to the Jargon File" available at http://catb.org/jargon/html/online-preface.html, 2 pages, last accessed Aug. 14, 2015.
(Continued)

*Primary Examiner* — Md. I Uddin
(74) *Attorney, Agent, or Firm* — Kunzler Law Group

(57) ABSTRACT

A system to apply persona styles to written communications. The system includes a communication analyzer and a modification engine. The communication analyzer receives an element of original content of a written communication. The communication analyzer also receives a selection of a persona style. The selected persona style defines a communication style. The modification engine presents a substitute element to a user in response to a determination that the element of the original content of the written communication is incompatible with the selected persona style. The substitute element is compatible with the selected persona style.

17 Claims, 7 Drawing Sheets

(51) Int. Cl.
*G06F 17/27* (2006.01)
*H04L 29/08* (2006.01)
*H04L 12/58* (2006.01)

(52) U.S. Cl.
CPC ...... *G06F 17/30684* (2013.01); *H04L 51/046* (2013.01); *H04L 67/306* (2013.01)

(58) Field of Classification Search
USPC ........ 707/732, 755, 767, 769, 790; 704/8, 9, 704/10
See application file for complete search history.

(56) References Cited

U.S. PATENT DOCUMENTS

| 7,013,427 B2* | 3/2006 | Griffith | G06F 17/2785 709/206 |
|---|---|---|---|
| 2004/0229194 A1 | 11/2004 | Yang | |
| 2006/0167866 A1 | 7/2006 | Farchi et al. | |
| 2007/0073532 A1* | 3/2007 | Brockett | G06F 17/289 704/9 |
| 2007/0166684 A1 | 7/2007 | Walker | |
| 2007/0214199 A1 | 9/2007 | Williams | |
| 2007/0288458 A1 | 12/2007 | Kacmarcik et al. | |
| 2009/0085762 A1 | 4/2009 | Yuki et al. | |

OTHER PUBLICATIONS

"Hacker Writing Style" available at http://catb.org/jargon/html/writing-style.html, 6 pages, last accessed Aug. 14, 2015.

"Writing Style Guide" available at http://web.mit.edu/6.863/www/logistics/style.html, 2 pages, last accessed Jun. 11, 2008.

Fujiwara et al., "A Study of Clarity Control of Synthesized Speech with Prosodic Features and Phonemic Features" ISCA Archive, (Mar. 23-26, 2004), available at http://www.isca-speech.org/archive, 4 pages. 1SCA.

"Accent Neutralization" available at http://disjointed.org/archives/2004/06/accent_neutrali.html, 2 pages, last accessed Jun. 11, 2008.

Howell "Strategy and Style in English and French Translations of Japanese Comic Books" Edinburgh Working Papers in Applied Linguistics, No. 11, (2001), 13 pages.

Payette et al. "An Intelligent Computer-Assistant for Stylistic Instruction" Computers and the Humanities, vol. 26, Issue 2, (Apr. 1992), pp. 87-102.

* cited by examiner

PERSONA MANAGEMENT SYSTEM FOR COMMUNICATIONS

CROSS-REFERENCE TO RELATED APPLICATIONS

This application is a continuation of U.S. patent application Ser. No. 12/137,346, filed on Jun. 11, 2008, and entitled, "Persona Management System for Communications," which is incorporated in its entirety herein.

BACKGROUND

There are many reasons why interpersonal communications may be misunderstood. Language and communication styles may be influenced by an individual's native language, education, developmental upbringing, social peers, and other influencing factors.

Sometimes communication misunderstandings result from the ethnic and cultural backgrounds of the individuals participating in the communication. For example, a person from Russia may provide a very "straight-forward" oral response to a question from a person from the United States of America. To some people, this type of response may be misunderstood as harsh, because someone familiar with the culture and prevalent communication styles might typically be more careful in word choice, tone, and delivery.

Communication misunderstandings also originate from, or may be intensified by, the medium of the communication. In the previous example, the misunderstanding during the oral conversation may be influenced by an individual's diction, tone, or word choice. External factors such as ambient noise also may lead to a misunderstanding. Excitement or hurriedness also may lead to a misunderstanding in the communication because of the way that a thought is expressed under the circumstances.

Many contemporary written forms of communication are highly susceptible to communication misunderstandings because of the lack of contextual qualifiers which, in other circumstances, might provide additional meaning to a communication. In particular, written communication tools such as electronic mail (e-mail or email), instant messaging (IM), and text messaging (texting) are commonly used in personal and business communications. These communication tools, while very effective in many ways, can lead to confusion as to what is meant by a particular communication because there are typically no contextual qualifiers to indicate the writer's tone, expression, or intent.

Additionally, it is often difficult to separate a person's natural writing style from the content of a written communication. While the actual words of a written communication may denote a particular meaning, the writer's style also may connote an additional meaning, which may be separate from the literal meaning of the communication. Hence, it is often difficult to determine from written communications whether a writer uses a specific writing style to communicate an additional meaning or emphasis, or whether the writing style is simply the writer's natural style and is not intended to connote any further meaning.

This ambiguity between literal meanings and other meanings, which may originate from individual writing styles, can cause additional problems in written communications. In addition to the possibility of using a style that is inconsistent with the literal meaning of the written communication, a person's natural writing style is often discernable from other individuals' writing styles. Thus, knowledge of a person's writing style often makes it easy to identify the author of a written communication. This can make it difficult, at times, to disguise or withhold authorship, for example, when the author attempts to remain anonymous.

SUMMARY

Embodiments of a system are described. In one embodiment, the system is a system to apply persona styles to written communications. An embodiment of the system includes a communication analyzer and a modification engine. The communication analyzer receives an element of original content of a written communication. The communication analyzer also receives a selection of a persona style. The selected persona style defines a communication style. The modification engine presents a substitute element to a user in response to a determination that the element of the original content of the written communication is incompatible with the selected persona style. The substitute element is compatible with the selected persona style. Other embodiments of the system are also described.

Embodiments of a method are also described. In one embodiment, the method facilitates applying persona styles to written communications. An embodiment of the method includes receiving an element of original content of a written communication. The method also includes receiving a selection of a persona style. The selected persona style defines a communication style. The method also includes presenting a substitute element to a user in response to a determination that the element of the original content of the written communication is incompatible with the selected persona style. The substitute element is compatible with the selected persona style. Other embodiments of the method are also described.

Embodiments of a computer program product are also described. In one embodiment, the computer program product includes a computer useable storage device to store a computer readable program that, when executed on a processor within a computer, causes the computer to perform operations to apply persona styles to written communications. An embodiment of the operations includes receiving an element of original content of a written communication. The operations also include receiving a selection of a persona style. The selected persona style defines a communication style. The operations also include presenting a substitute element to a user in response to a determination that the element of the original content of the written communication is incompatible with the selected persona style. The substitute element is compatible with the selected persona style. Other embodiments of the computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate dynamic analysis of written communications, or messages, between users of a chat session. The chat session may incorporate a persona repository. In some embodiments, the persona repository is a collection of several persona styles. Each persona style conveys a certain style of expression such as diplomatic, pragmatic, friendly, harsh, and so forth. In some embodiments, the persona repository allows a user to dynamically modify a text string according to a selected persona style. The selected persona style maintains the meaning of a text string while adapting the text string to include an inherent mood, strength, and/or feeling based on the selected persona style. Hence, according to the selected persona style, a text string may be modified to convey the desired style of expression. Other embodiments are also described below with specific reference to the corresponding figures.

Figure 1:
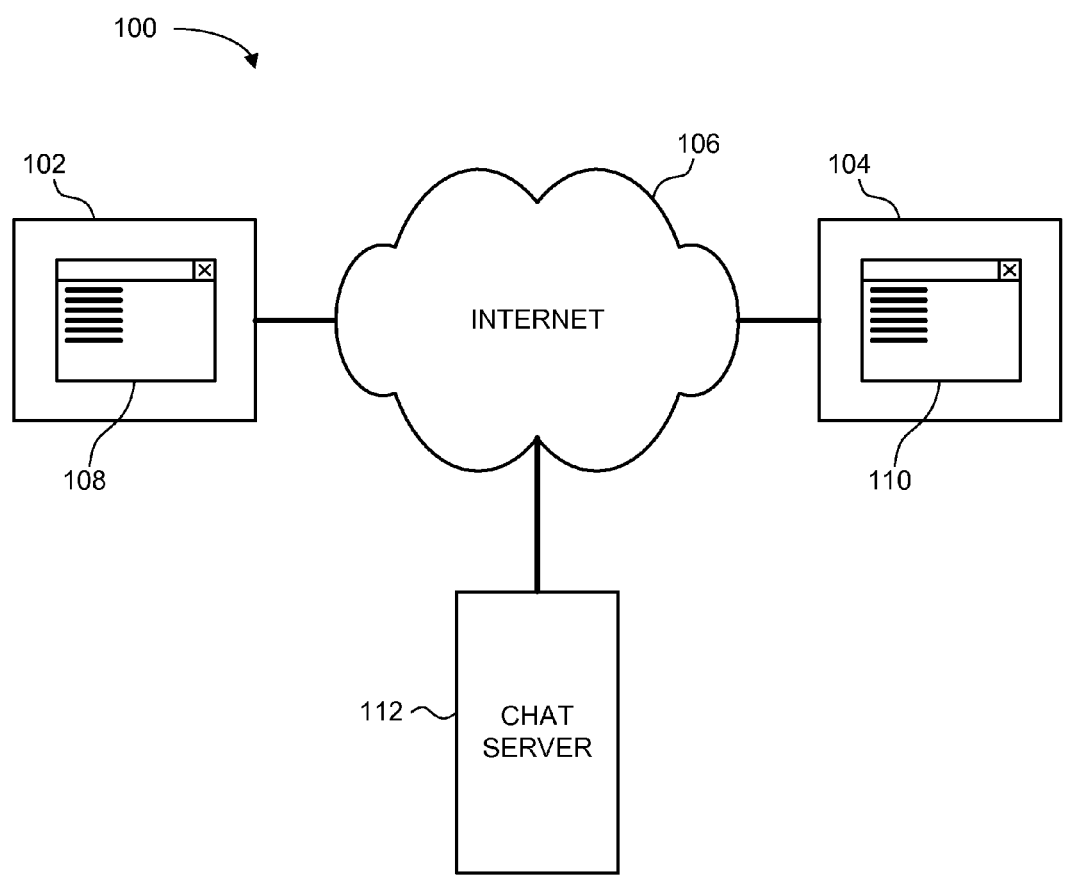
FIG. 1 depicts a schematic block diagram of one embodiment of an instant messaging (IM) system.

FIG. 1 depicts a schematic block diagram of one embodiment of an instant messaging (IM) system 100. Although FIG. 1 depicts communications related to the illustrated IM system 100, other communications systems may also be implemented such as an electronic mail (e-mail, or email) system, a metaverse system, and so forth.

The illustrated IM system 100 includes multiple nodes 102 and 104 connected together via a computer communication network such as the internet 106. The nodes 102 and 104 are also referred to, in some instances, as client computers 102 and 104. Each of the nodes 102 and 104 may be referred to as a sending node and/or a receiving node, depending on the direction of data flow between the nodes 102 and 104 at any given time. It should also be noted that the IM system 100 may include more than two nodes. Each node 102 and 104 implements an IM client (represented by the depicted IM user interfaces 108 and 110) so that an IM chat session may be realized between the IM clients.

Figure 4:
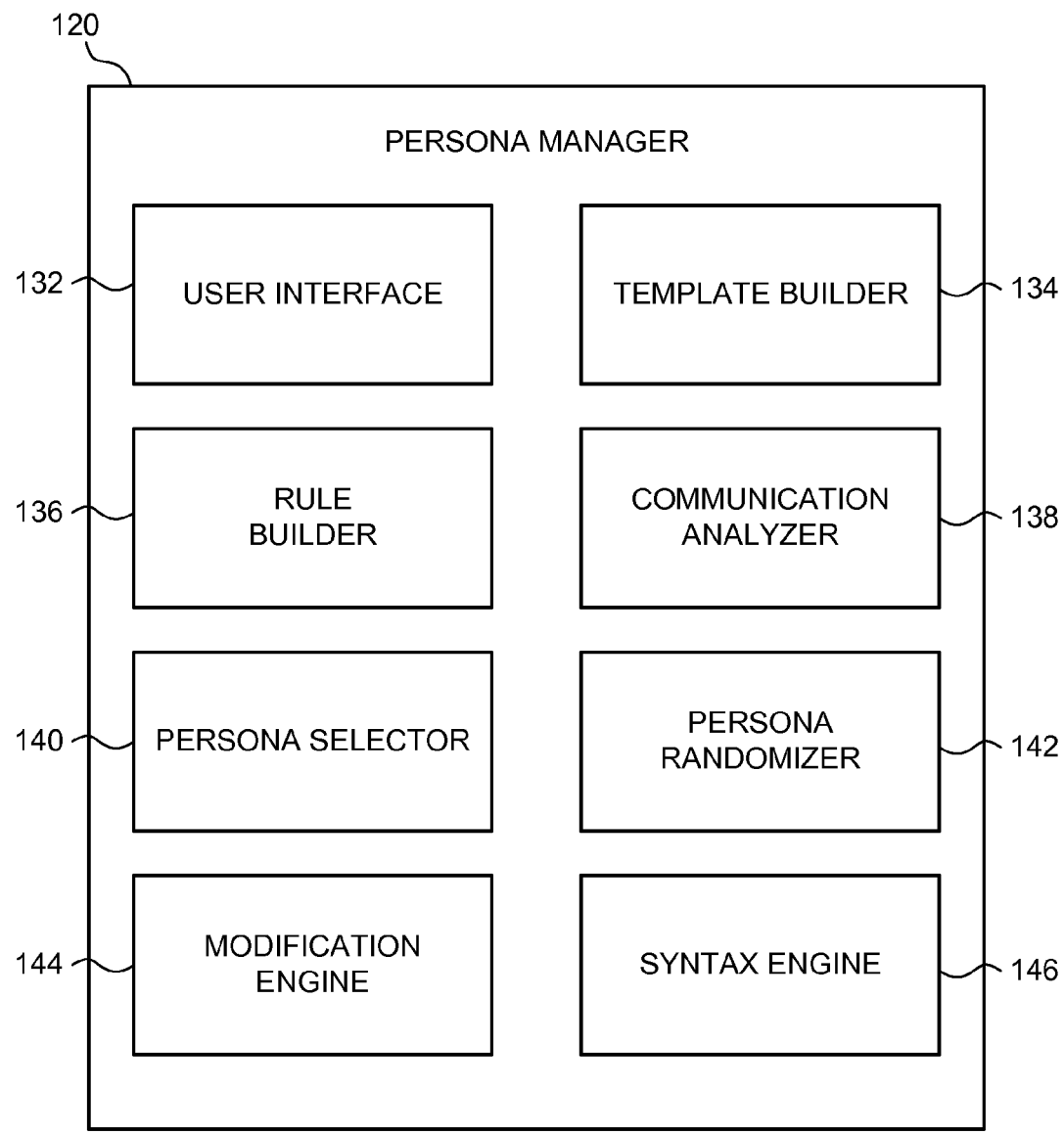
FIG. 4 depicts a schematic block diagram of one embodiment of the persona manager of FIGS. 2 and 3.

The illustrated IM system 100 also includes a chat server 112 to facilitate an IM chat session between the multiple nodes 102 and 104. One example of the chat server 112 is shown in FIG. 4 and described in more detail below. In some embodiments, the chat server 112 facilitates a chat session between the IM clients on the various nodes 102 and 104. Additionally, where more than two nodes and IM clients are present within the IM system 100, the chat server 112 may facilitate a single IM chat session among more than two nodes, or multiple IM sessions between the same or different nodes within the IM system 100. It should be noted that the configurations of the nodes 102 and 104, the IM clients, and the chat server 112 are not limited to particular hardware or software implementations. For example, multiple chat servers 112 may be present within the IM system 100 to facilitate multiple simultaneous IM sessions.

When instant messages are transmitted, for example, from the sending node 102 to the receiving node 104, the instant messages are parsed and may be displayed to users via the IM user interfaces 108 and 110 at the corresponding nodes 102 and 104. Additionally, the instant message transmissions may include information pertaining to the sending user, information pertaining to the receiving user, and other pertinent data such as chat information and data. This data can be extracted from the instant message and optionally displayed by the IM user interfaces 108 and 110. Examples of pertinent data include references to the sender and one or more recipients, by user name and/or network IP addresses. Pertinent data also can include a message subject, timestamps, or other similar data. Timestamps may include a date and/or time corresponding to the transmitted instant message.

Additionally, a voice communications link can be established between the nodes 102 and 104. Although a voice communications link can be provided through any suitable voice communications technology, at least one embodiment establishes the voice communications link over the internet 106 based upon the established Voice over IP (VoIP) protocol. Other embodiments may use other protocols or technologies to establish the voice communications link between the nodes 102 and 104.

Figure 2:
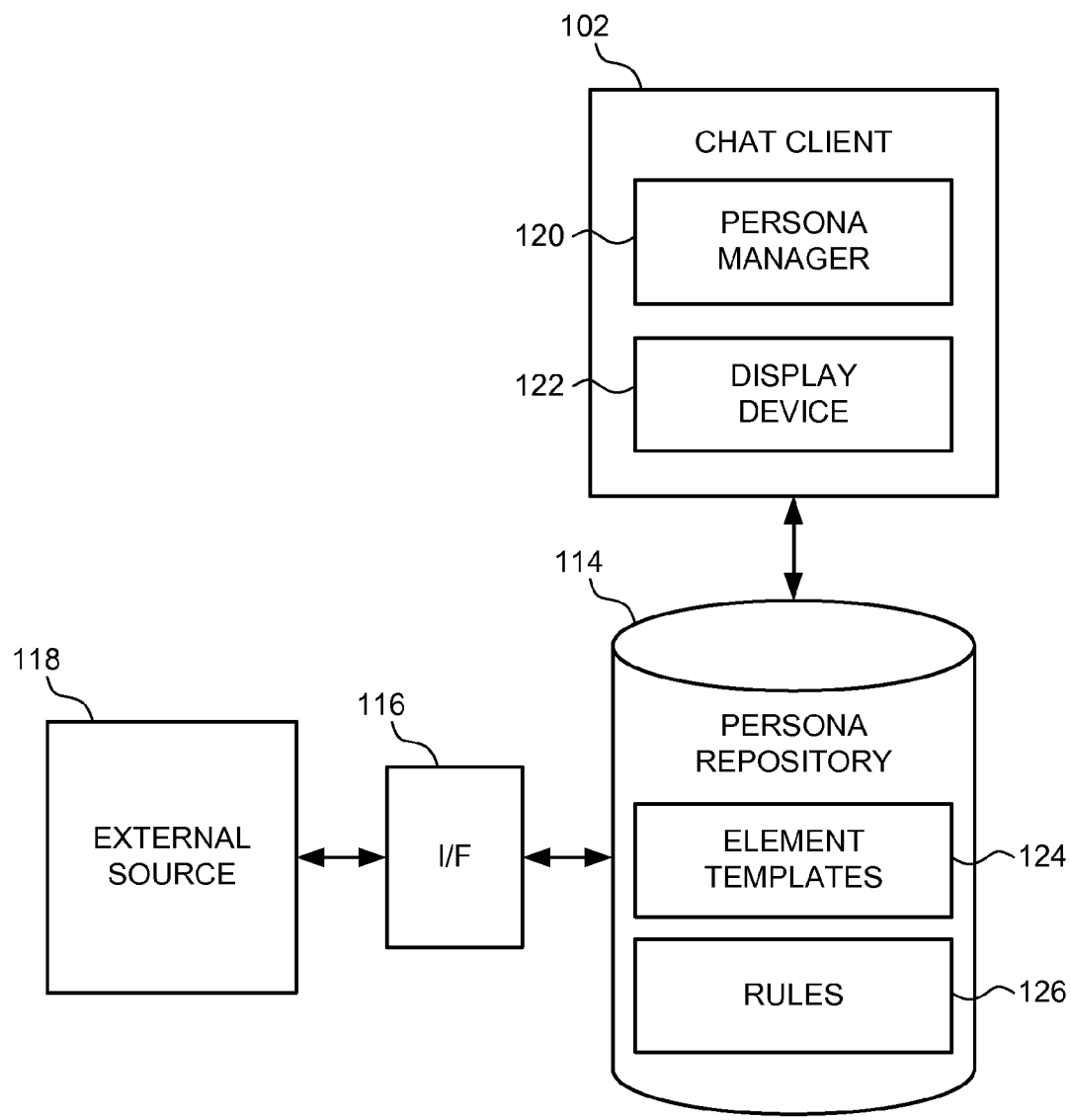
FIG. 2 depicts a schematic block diagram of one embodiment of a persona input system for use with the IM system of FIG. 1.

FIG. 2 depicts a schematic block diagram of one embodiment of a persona input system 101 for use with the IM system 100 of FIG. 1. The illustrated chat client 102 includes a persona manager 120 and a display device 122. Additionally, as depicted, the chat client 102 connects to a persona repository 114. Additionally, as depicted, the persona repository 114 connects to an interface 116. The interface 116 subsequently connects the persona repository to an external source 118.

In some embodiments, the display device 122 displays a chat user interface similar to the chat user interfaces 108 and 110 described above. Although the depicted chat client 102 includes the persona manager 120 and the display device 122, other embodiments of the chat client 102 may include fewer or more components. Additionally, at least some of the resources of the chat client 102 may be shared among multiple clients. Additionally, at least some of the resources of the chat server 112 may be shared among client computers such as the chat client 102 depicted in FIG. 2. Other configurations may also be implemented.

The illustrated persona manager 120 facilitates a persona implementation operation on communications related to a chat session between the multiple nodes 102 and 104. One example of the persona manager 120 is shown in FIG. 4 and described in more detail below.

The illustrated persona repository 114 stores element templates 124 and rules 126. In one embodiment, the persona repository 114 allows a user to dynamically select and apply a certain persona style stored in the persona repository 114 to a message generated by the user. Although FIG. 2 depicts the chat client 102 connecting directly to the persona repository 114, in some embodiments, the chat client 102 connects to the persona repository 114 via the chat server 112. In some embodiments, the element templates 124 include a list of template sentences that a user can select according to a selected persona. In some embodiments, a template sentence is selected by the persona manager 120 according to a persona style selection. In some embodiments, the template sentences include fill-in-the-blank sentences. Hence, in some embodiments, the persona manager 120 selects a template sentence and dynamically fills in the blanks according to the persona style selection. Alternatively, in some embodiments, the user selects a sentence from the list of template sentences and then fills in the fill-in blanks of the selected sentence.

Additionally, the persona repository 114 allows a user to apply the rules 126 to an existing message to propose suggestions of how the message may be modified to convey a desired style of expression in association with the message. In some embodiments, the rules 126 include a set of persona attributes. Examples of persona attributes may include a situation attribute, a domain attribute, a mood attribute, a strength attribute, a tone attribute, an age attribute, a gender attribute, and so forth. The situation attribute may include customer support, sales/negotiations, project/people management, marketing, and so forth. Domain attributes include technical domains, law domains, art domains, sports domains, etc. Mood attributes include very happy, happy, neutral, sad, angry, very angry, etc. Strength attributes include very strong (e.g., "I strongly disagree with you"), strong (e.g., "I disagree with you"), neutral (e.g., "is there another approach?"), and so forth. Tone attributes include a diplomatic tone, a straight forward tone, a hostile tone, and so forth. Age attributes include teenagers, young adults, middle age adults, and seniors. Gender attributes include male and female. Additionally, the element templates 124 may be listed and/or sorted according to the set of persona attributes.

In one embodiment, the interface 116 facilitates a connection between the persona repository 114 and the external source 118. Moreover, the interface 116 facilitates a query session between the persona repository 114 and the external source 118. The external source 118 may include a dictionary, a thesaurus, a style guide, and so forth. More specifically, in some embodiments, the external source 118 includes an online dictionary, an online thesaurus, and an online style guide. Additionally, the dictionary may include at least one translation dictionary. In some embodiments, the external source 118 includes words, sentences, clauses, and phrases classified under context. Additionally, in some embodiments, the external source 118 includes attributes such as persona, tone, and appropriateness.

In some embodiments, the external source 118 includes a supplementary repository to the persona repository 114. The persona repository 114 consults the external source 118 for additional information and existing semantic and linguistic associations. In some embodiments, the persona repository 114 consults the external source 118 to analyze an element of a user's message such as an acronym, an idiom, word choice, and so forth. Hence, in some embodiments, the persona repository 114 queries the external source 118 to propose alternate wording for the element of the user's message as well as alternative moods and tones to the word choices made by the user relative to the user's message.

Figure 3:
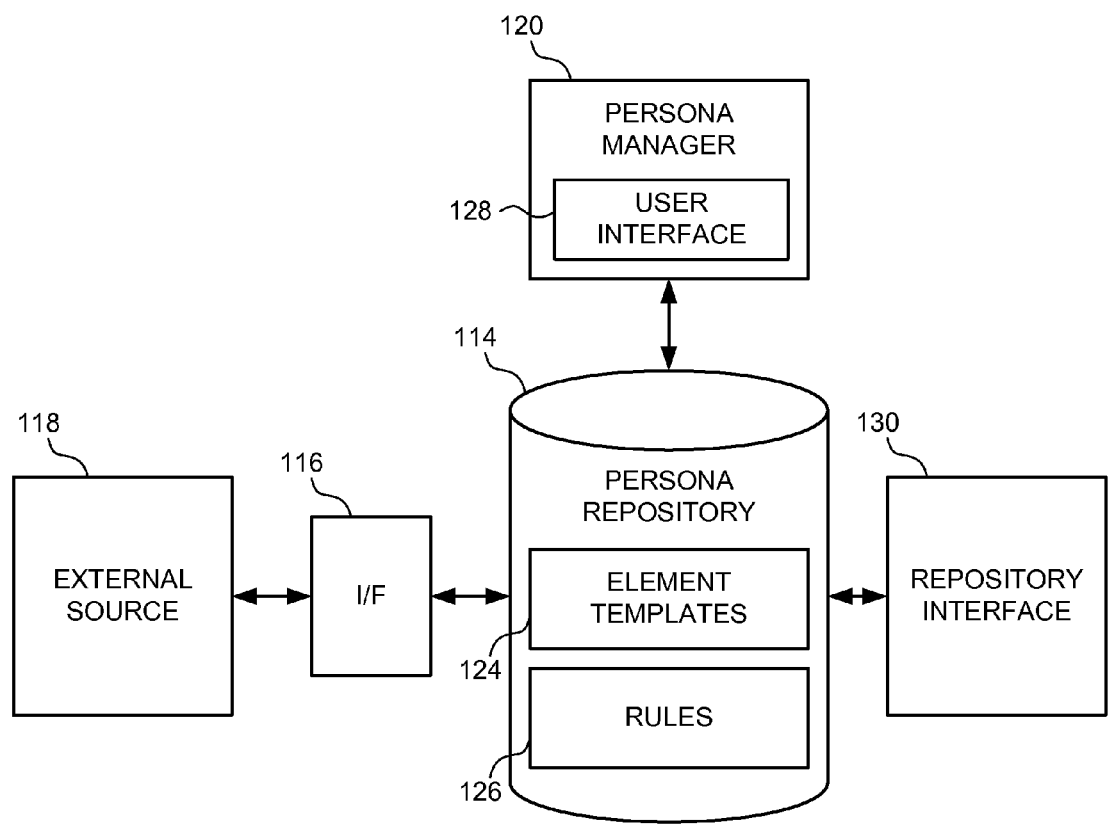
FIG. 3 depicts a schematic block diagram of one embodiment of a persona management system for use with the IM system of FIG. 1.

FIG. 3 depicts a schematic block diagram of one embodiment of a persona management system 103 for use with the IM system 100 of FIG. 1. In one embodiment, the user interface 128 connects to the persona repository 114 via the persona manager 120. Additionally, as depicted, the persona repository 114 connects to a repository interface 130. In some embodiments, the components depicted in FIG. 2 and described above are substantially similar to the components of FIG. 3, except as noted below.

In one embodiment, the user interface 120 allows a user to interface with the persona repository 114. More specifically, the user interface 128, in some embodiments, allows a user to interface with the element templates 124 and the rules 126 stored in the persona repository 114. In some embodiments, the display device 122 displays the user interface 128 to a user. In some embodiments, the user interface 128 facilitates the creation of one of the sentence templates stored in the element templates 124. Additionally, in some embodiments the user interface 128 facilitates the editing of an existing sentence template stored in the element templates 124. Likewise, in some embodiments, the user interface 128 facilitates the creation and/or editing of a rule stored in the rules 126.

In one embodiment, the repository interface 130 also allows a user to interface with the persona repository 114. More specifically, the repository interface 130 allows an administrator of the persona repository 114 to manage the persona repository 114. In some embodiments, the repository interface 130 is a direct interface to the persona repository 114. In some embodiments, the repository interface 130 also allows a user to interface with the element templates 124 and the rules 126 stored in the persona repository 114 similar to the user interface 120 described above. Additionally, in some embodiments, the repository interface 130 facilitates the creation of a connection between the persona repository 114 and the external source 118 through the interface 116. Likewise, in some embodiments, the repository interface 130 facilitates the editing of an existing connection between the persona repository 114 and the external source 118.

FIG. 4 depicts a schematic block diagram of one embodiment of the persona manager 120 of FIGS. 2 and 3. The illustrated persona manager 120 includes a user interface 132, a template builder 134, a communication analyzer 138, and a rule builder 136. Additionally, the persona manager 120 includes a persona selector 140, a persona randomizer 142, a modification engine 144, and a syntax engine 146. It should be noted that the configurations of the persona manager 120 are not limited to particular hardware or software implementations. Although the depicted persona manager 120 is shown and described herein with certain components and functionality, other embodiments of the persona manager 120 may be implemented with fewer or more components or with more or less functionality. For example, some embodiments of the persona manager 120 include a local memory device (not shown) to store instructions and data related to the functions of the persona manager 120. Additionally, some embodiments of the persona manager 120 include similar components arranged in another manner to provide similar functionality, in one or more aspects.

In one embodiment, the user interface 132 is substantially similar to the user interface 128 described above in relation to FIG. 3. Hence, in some embodiments, the user interface 132 allows a user to interface with the persona repository 114. Likewise, in some embodiments, the user interface 132 allows a user to interface with the element templates 124 and/or the rules 126 stored in the persona repository 114. Additionally, in some embodiments, the user interface 132 allows a user to interface with the persona manager 120. Hence, in some embodiments, the user is enabled to select settings associated with the persona manager 120 and components thereof and allows the user to customize the functions of the persona manager 120.

In one embodiment, the template builder 134 builds a sentence template. In some embodiments, the sentence template includes a fill-in-the-blank sentence. Furthermore, in some embodiments, the template builder 134 stores the sentence template in the element templates 124. In some embodiments, as described above, the element templates 124 contain a list of sentence templates. Hence, in some embodiments, the user selects a sentence template from the list of sentence template stored in the element templates 124 and completes the fill-in-the-blank sentence. In some embodiments, the template builder 134 allows a user to build a sentence template. Likewise, in some embodiments, the template builder 134 allows the user to edit an existing sentence template. Alternatively, in some embodiments, the template builder 134 autonomically generates a sentence template variation in conjunction with the persona repository 114 from an existing sentence template.

In one embodiment, the rule builder 136 builds a rule in association with a style of expression, or persona style. In some embodiments, the rule builder 136 stores the rule in the rules 126. In some embodiments, as described above the rules 126 contain a set of rules. The set of rules defines a modification process to modify an original content of a user's message to replace an element of the original content with a substitute element. More specifically, the set of rules defines a modification process to replace the element of the original content with the substitute element that is compatible with a persona style selected by the user.

In one embodiment, the communication analyzer 138 analyzes a user's written communication, or message. More specifically, the communication analyzer 138 analyzes a user's message to ensure that the user's message conveys a desired style of expression. As explained above, the message may be part of an email, an instant messaging (IM) chat, a text message such as through the short messaging service (SMS), a metaverse communication, and so forth. In some embodiments, the communication analyzer 138 identifies an element of original content of the user's message. Additionally, in some embodiments, the communication analyzer 138 performs linguistic analysis on the original content of the user's message to identify certain elements of the original content of the user's message. The elements may include common phrases, acronyms, clauses, tones, styles, word choices, and so forth.

In some embodiments, the communication analyzer 138 derives a context for the user's message. In other words, the communication analyzer 138 takes into account a context of the user's message such as a user location, a user profile, a user environment, a relationship between the user and the person to whom the user is communicating, etc. Hence, the context can be derived from system properties and application configuration variables. For example, the system properties or application configuration variables could be operating system local settings, a network address, browser local settings, and so on. Additionally, the context of the system properties or application configuration variables could be a social context based on corporate directory relations, an organizational hierarchy, and so forth.

In some embodiments, the communication analyzer 138 proposes to the user a substitute element to replace the element of the original content of the user's message under consideration. In some embodiments, the communication analyzer 138 analyzes the element of the original content of the user's message according to a persona style selected by the user.

In one embodiment, the persona selector 140 selects the persona style from a list of persona styles stored in the persona repository 114. Each persona style defines a unique communication style, or style of expression. In some embodiments, the persona randomizer 142 randomly selects a persona style from the list of persona styles. For example, when a user in a conversation wishes to remain anonymous such as a situation when a frank opinion on a sensitive subject is solicited amongst several participants, the persona randomizer 142 generates a neutral mood by randomly selecting a persona style to protect the anonymity of the user.

In one embodiment, the modification engine 144 modifies the original content of the user's message to replace the element of the original content with a substitute element that is compatible with the selected persona style. In some embodiments, the modification engine 144 modifies the original content of the written communication according to a neutral persona style in response to a selection of an author to remain anonymous. In other words, the modification engine 144 implements the persona style selected by the user so that a message from the user conveys a style of expression desired by the user.

In one embodiment, the syntax engine 146 determines that an element of the original content of the user's message is incompatible with a selected persona style. The selected persona style defines a communication style. In other words, the implementation of a selected persona style may cause a replacement of some of the words of a user's message. The replacement of certain words in the user's message may then make the sentence incompatible with the selected persona style. The syntax engine 146 analyzes the syntactical elements of the user's message following the replacement of some of the words in the user's message to determine whether the syntax of the user's message contains a syntactical incompatibility.

In an example embodiment, the user's message includes the text string "John is a jerk. I avoid him." Without any selected persona style, the message remains as is. If the user selects a persona style such as "Strong," then the communication analyzer 138 in conjunction with the modification engine 144 may return the text string as "John is a jerk. I avoid him." If the user selects a persona style such as "Moderate," then the communication analyzer 138 in conjunction with the modification engine 144 may return the text string as "John is a behaves badly. I avoid him," where the modification engine 144 replaces the strong word "jerk" with the moderate version "behaves badly." However, the modified text string contains a syntactical incompatibility. Hence, the syntax engine 146 analyzes the modified text string and removes the element "is a" from the text string, and outputs the text string as "John behaves badly. I avoid him."

Furthermore, if the user selects a persona style such as "Diplomatic," then the communication analyzer 138 in conjunction with the modification engine 144 may return the text string as "John is a behaves as expected. I stay away him." In other words, the communication analyzer 138 detects that the word "jerk" is a negative word and inverts "jerk" with the positive phrase "behaves as expected." Additionally, the communication analyzer 138 replaces "avoid" with a more diplomatic "stay away." However, again the modified text string contains syntactical incompatibilities. Hence, the syntax engine 146 analyzes the modified text string and replaces the element "is a" with the element "does not" to compensate for the inversion, adds the element "from" between "stay away" and "him," and outputs the text string as "John does not behave as expected. I stay away from him."

Figure 5:
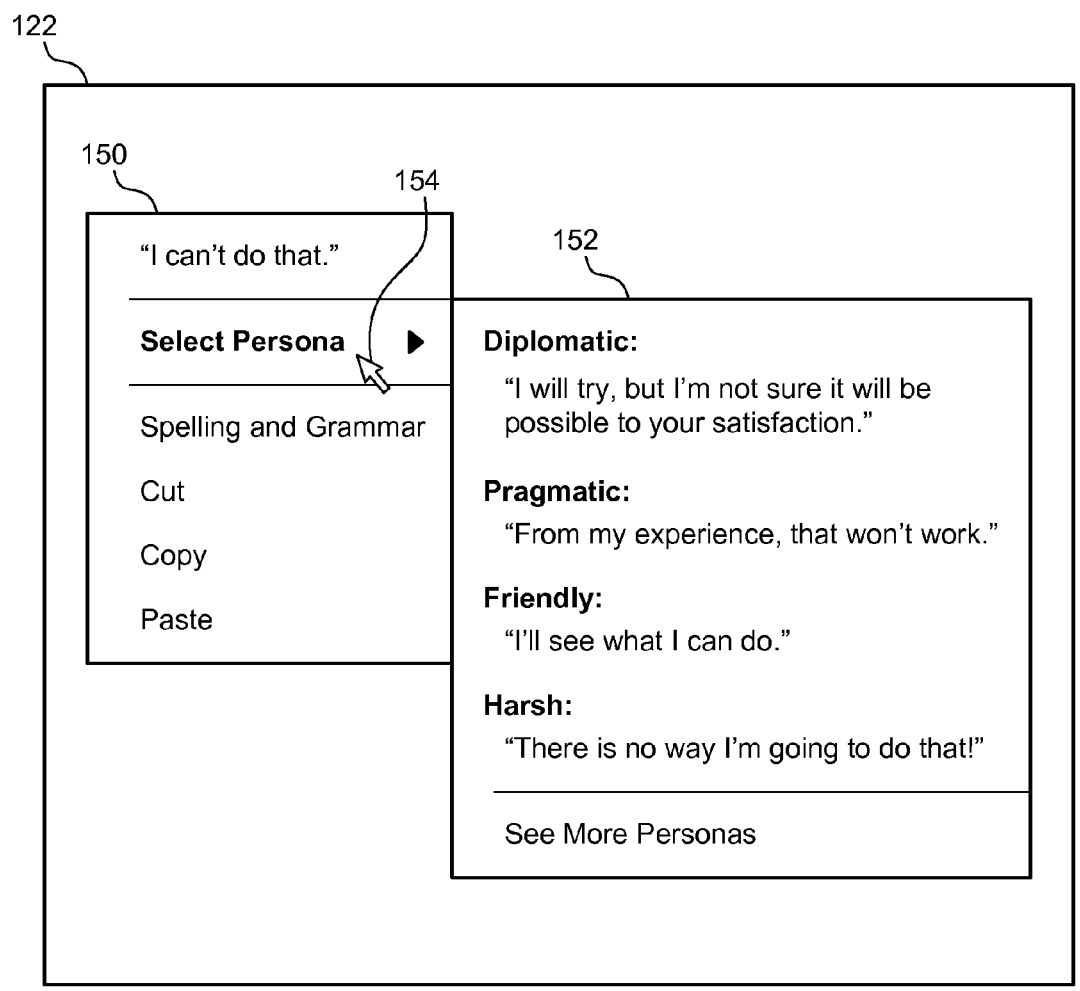
FIG. 5 depicts a schematic block diagram of one embodiment of a graphical user interface for display on the display device of FIG. 4.

FIG. 5 depicts a schematic block diagram of one embodiment of a graphical user interface for display on the display device of FIG. 4. In particular, FIG. 5 shows the details generated by the user interface 132 within a graphical user interface (GUI) for display on the display device 122, in order to allow a user to select a persona style from a context menu 150. It should be noted that other embodiments of the context menu 150 may be integrated with existing or new interfaces that are used to display related information.

The illustrated context menu 150 includes a select persona menu option 152. The select persona menu option 152 is accessed, as depicted, by directing a mouse cursor 154 to the select persona menu option 152. As depicted, the select persona menu option 152 includes a Diplomatic persona style, a Pragmatic persona style, a Friendly persona style, a Harsh persona style, and an option for more persona styles. More persona styles may include a random or neutral persona style, as described above, to disguise the identity of a user. As depicted, the user highlights the text string "I can't do that" from the user's message and right clicks on the highlighted text string. The top of the context menu 150 displays the highlighted text. Additionally, the user selects the select persona menu option 152. The select persona menu option 152 includes a dialogue that displays to the user a suggested modified version of the highlighted text according to a persona style. For example, as depicted, the Diplomatic persona style includes the suggested modified version of the text string as "I will try, but I'm not sure it will be possible to your satisfaction." Other persona styles include similar suggested modified versions of the text string related to the particular persona style. Thus, in some embodiments, the user highlights a text string and selects a modified version of the highlighted text string according to a desired expression of style.

Figure 6:
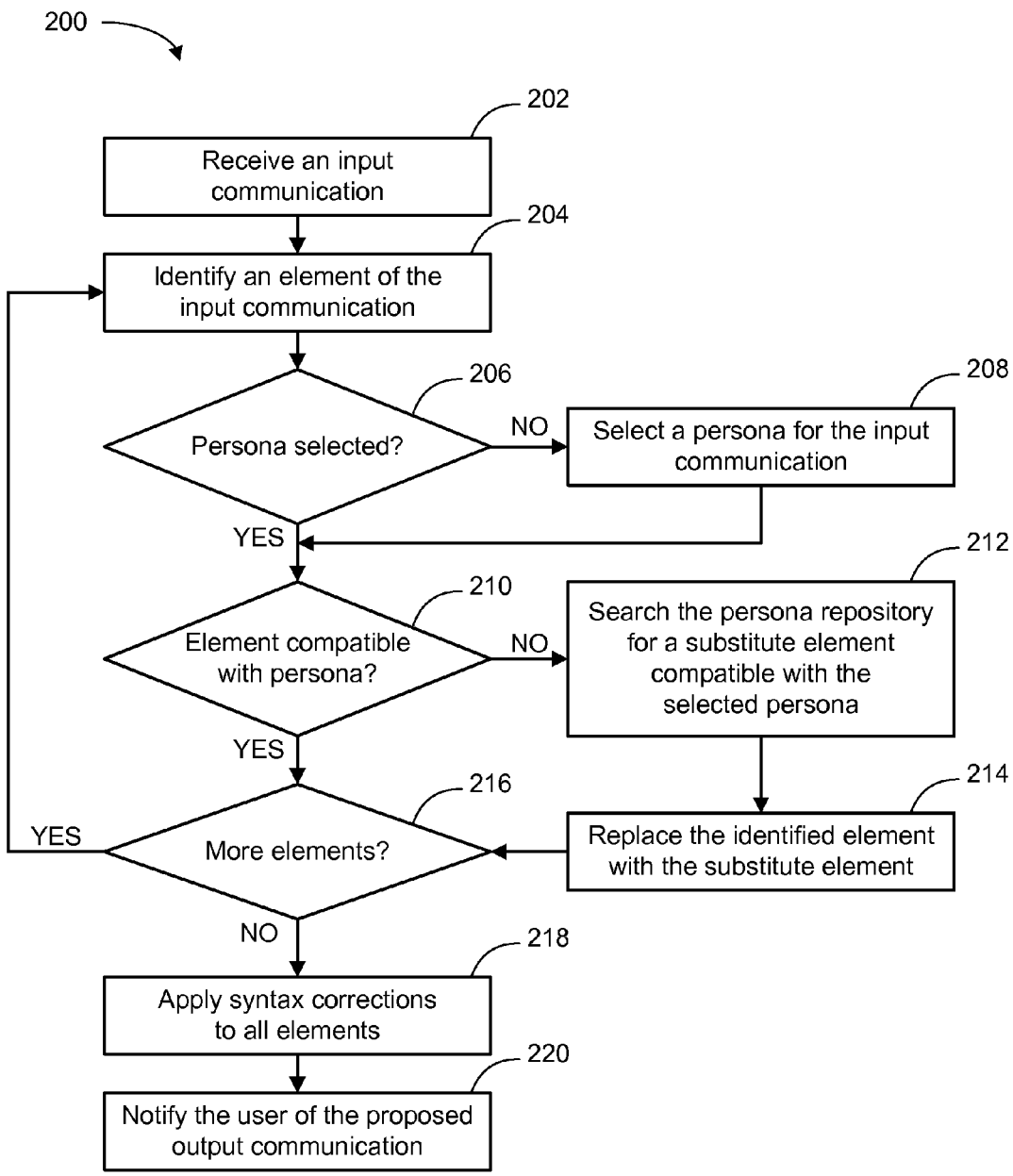
FIG. 6 depicts a flow chart diagram showing one embodiment of a method for applying a selected persona to an input communication.

FIG. 6 depicts a flow chart diagram showing one embodiment of a method 200 for applying a selected persona to an input communication. For ease of explanation, the implementation method 200 is described with reference to the IM system 100 of FIG. 1. However, some embodiments of the implementation method 200 may be implemented with other communication systems. Additionally, the implementation method 200 is described in conjunction with the persona manager 120 of FIG. 4, but some embodiments of the method 200 may be implemented with other persona managers.

In the illustrated implementation method 200, in one embodiment, the persona manager 120 receives 202 an input communication. As described above, the input communication may include text from an e-mail, and instant message, a text message, and so forth. The communication analyzer 138, in some embodiments, identifies 204 an element of the input communication. The communication analyzer 138 then determines 206 whether a persona style is selected. If the communication analyzer 138 determines 206 that a persona style is not selected, the persona selector 140 selects 208 a persona for the input communication.

Otherwise, the syntax engine 146 determines 210 whether the identified element is compatible with the selected persona. If the syntax engine 146 determines 210 that the identified element is not compatible with the selected persona, the syntax engine 146 searches 212 the persona repository 114 for a substitute element compatible with the selected persona. The syntax engine 146 then replaces 214 the identified element with the substitute element.

Otherwise, the communication analyzer 138 determines 216 whether there are any more elements associated with the input communication. If the communication analyzer 138 determines 216 that there are more elements associated with the input communication, then the communication analyzer 138 identifies 204 the next element of the input communication.

Otherwise, the modification engine 144 applies 218 a syntactical correction to each element. In some embodiments, the user interface 132 then notifies the user of a proposed output communication. In some embodiments, the user interface 132 displays the notification on the display device 122.

Figure 7:
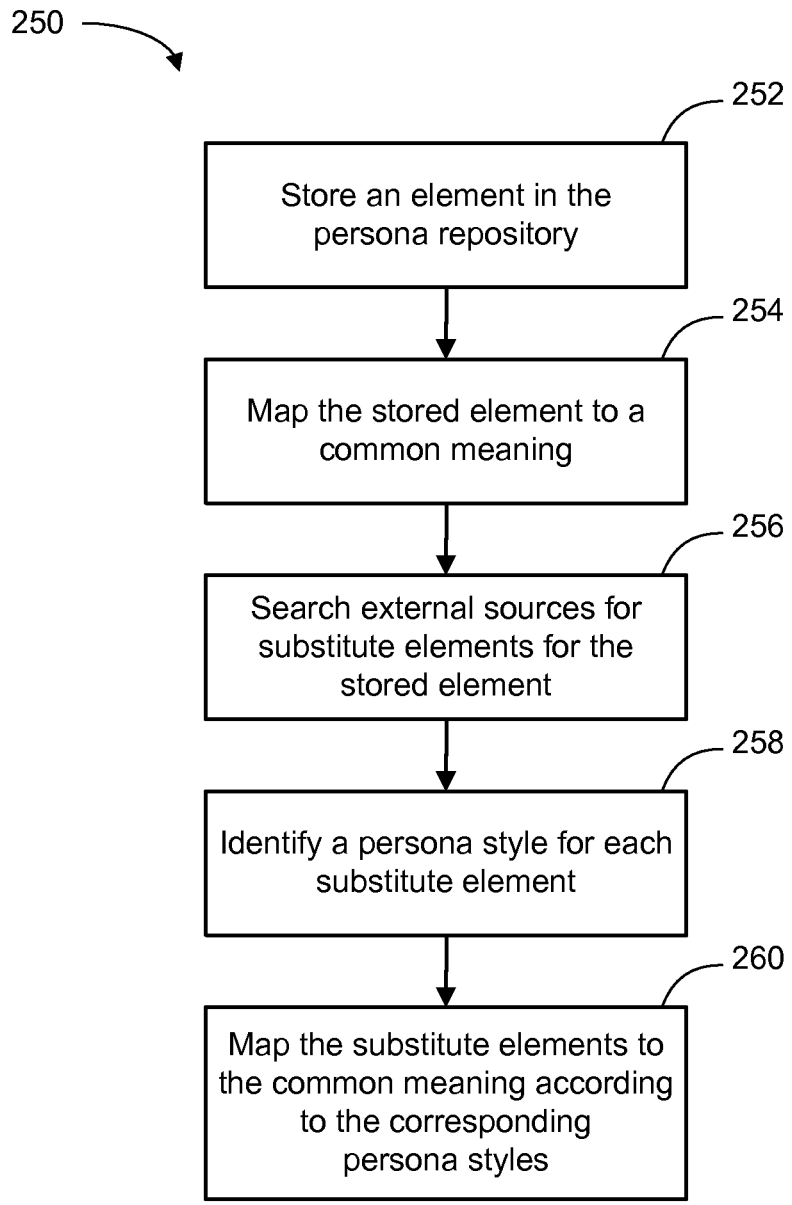
FIG. 7 depicts a flow chart diagram showing one embodiment of a method for maintaining the persona repository of FIG. 2.

FIG. 7 depicts a flow chart diagram showing one embodiment of a method 250 for maintaining the persona repository of FIG. 2. For ease of explanation, the maintenance method 250 is described with reference to the IM system 100 of FIG. 1. However, some embodiments of the maintenance method 250 may be implemented with other communication systems. Additionally, the maintenance method 250 is described in conjunction with the persona manager 120 of FIG. 4, but some embodiments of the method 250 may be implemented with other persona managers.

In the illustrated maintenance method 250, the template builder 134 stores 252 an element in the persona repository 114. As explained above, the element may include a fill-in-the-blank template sentence. In some embodiments, the template builder 134 maps 254 the stored element to a common meaning.

In one embodiment, the persona repository 114 searches 256 the external source 118 for a substitute element of the stored element. The communication analyzer 138, in some embodiments, identifies 258 a persona style for the substitute element. The communication analyzer 138 then maps 260 the substitute element to the common meaning according to the corresponding persona style.

As explained above, the persona manager 120 allows a user to adapt communication message styles and tones to achieve a desired communication result. Further, by selecting a specific or random persona, a user is enabled to disguise his or her identity. For example, when a user in a conversation wishes to remain anonymous such as a situation when a frank opinion on a sensitive subject is solicited amongst several participants, the persona randomizer 142 generates a neutral mood by randomly selecting a persona style to protect the anonymity of the user to facilitate a user in hiding their personal style to protect the anonymity of the user.

It should also be noted that at least some of the operations for the methods 200 and 250 may be implemented using software instructions stored on a computer useable storage medium for execution by a computer. As an example, an embodiment of a computer program product includes a computer useable storage medium to store a computer readable program that, when executed on a computer, causes the computer to perform operations to apply persona styles to written communications, including operations to identify an element of original content of a written communication, to determine that the element of the original content of the written communication is incompatible with a selected persona style, and to modify the original content of the written communication to replace the element of the original content with a substitute element that is compatible with the selected persona style. The selected persona style defines a communication style.

Furthermore, some embodiments of the operations also include operations to perform linguistic analysis on the original content of the written communication to identify a plurality of elements of the original content of the written communication, to derive a context for the written communication from system properties and application configuration variables, and to propose the substitute element for replacement of the element of the original content for consideration by an author of the original content of the written communication.

Additionally, some embodiments of the operations also include operations to store a plurality of persona styles in a persona repository, to store a sentence template, and to store a set of rules. Each persona style defines a unique communication style. The sentence template includes a fill-in-the-blank sentence for completion by a user, and to store a set of rules. The set of rules defines a modification process to modify the original content of the written communication to replace the element of the original content with the substitute element that is compatible with the selected persona style. The operations also include operations to perform syntax analysis on the written communication with the substitute element to determine a compliance with a plurality of syntax rules and to select the persona style from the plurality of persona styles stored in the persona repository.

In some embodiments, the selection of persona styles includes a randomly selected persona style and a neutral persona style. Hence, some embodiments of the operations include operations to randomly select the persona style, and to modify the original content of the written communication according to a neutral persona style in response to a selection of an author to remain anonymous.

Embodiments of the invention can take the form of an entirely hardware embodiment or an embodiment containing both hardware and software elements such as firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A non-transitory computer program product comprising a computer useable storage device to store a computer readable program that, when executed on a processor within a computer, causes the computer to perform operations to apply persona styles to written communications, the operations comprising:
   receive an element of original content from a written communication of a user;
   receive a selection of a persona style, wherein the selected persona style defines a communication style, the persona style one of a plurality of unique persona style stored in a persona repository, wherein the selected persona style maintains the meaning of a text string while adapting the text string to include an inherent mood, strength, and/or feeling based on the selected persona style and wherein according to the selected persona style, a text string may be dynamically modified to convey the desired style of expression;
   present a plurality of substitute elements to the user, via the electronic display, wherein each substitute element is compatible with a unique persona style, and at least one substitute element is compatible with the selected persona style, in response to a determination that the element of the original content of the written communication is incompatible with the selected persona style; and
   replace the element of the original content with the substitute element in response to a selection of the substitute element by the user.

2. The non-transitory computer program product of claim 1, wherein the computer readable program, when executed on the computer, causes the computer to perform an operation to perform linguistic analysis on the original content of the written communication to identify a plurality of elements of the original content of the written communication.

3. The non-transitory computer program product of claim 1, wherein the computer readable program, when executed on the computer, causes the computer to perform an operation to derive a context for the written communication from system properties and application configuration variables.

4. The non-transitory computer program product of claim 1, wherein the computer readable program, when executed on the computer, causes the computer to perform an operation to perform syntax analysis on the written communication with the substitute element to determine compliance with a plurality of syntax rules.

5. The non-transitory computer program product of claim 1, wherein the computer readable program, when executed on the computer, causes the computer to perform an operation to store a sentence template, wherein the sentence template comprises a fill-in-the-blank sentence for completion by a user.

6. The non-transitory computer program product of claim 1, wherein the computer readable program, when executed on the computer, causes the computer to perform an operation to store a set of rules, wherein the set of rules defines a modification process to modify the original content of the written communication to replace the element of the original content with the substitute element that is compatible with the selected persona style.

7. The non-transitory computer program product of claim 1, wherein the selected persona style comprises a neutral persona style, wherein the computer readable program, when executed on the computer, causes the computer to modify the original content of the written communication according to a neutral persona style in response to a selection of the user to remain anonymous.

8. A system comprising:
a processor implemented in hardware;
a communication analyzer, executable on the processor, to receive an element of original content from a written communication of a user and receive a selection of a persona style, wherein the selected persona style defines a communication style, the persona style one of a plurality of unique persona style stored in a persona repository, wherein the selected persona style maintains the meaning of a text string while adapting the text string to include an inherent mood, strength, and/or feeling based on the selected persona style and wherein according to the selected persona style, a text string may be dynamically modified to convey the desired style of expression;
a modification engine, executable on the processor, coupled to the communication analyzer to present a plurality of substitute elements to the user, wherein each substitute element is compatible with a unique persona style, and at least one substitute element is compatible with the selected persona style, in response to a determination that the element of the original content of the written communication is incompatible with the selected persona style; and
modify the original content of the written communication to replace the element of the original content with the substitute element in response to a selection of the substitute element by the author.

9. The system of claim 8, further comprising:
a persona repository to store a plurality of persona styles, wherein each persona style defines a unique communication style; and
a persona selector coupled to the persona repository, wherein the persona selector is configured to select the persona style from the plurality of persona styles.

10. The system of claim 9, further comprising a user interface coupled to the persona repository, the user interface to allow a user to store the plurality of persona styles in the persona repository.

11. The system of claim 10, further comprising a template builder coupled to the persona repository, the template builder to store a sentence template in the persona repository, wherein the sentence template comprises a fill-in-the-blank sentence for completion by a user.

12. The system of claim 10, further comprising a rule builder coupled to the persona repository, the rule builder to store a set of rules in the persona repository, wherein the set of rules defines a modification process to modify the original content of the written communication to replace the element of the original content with the substitute element that is compatible with the selected persona style.

13. The system of claim 9, wherein the modification engine is further configured to modify the original content of the written communication according to a neutral persona style in response to a selection of the user to remain anonymous.

14. A method for applying persona styles to written communications, the method comprising:
receiving an element of original content from a written communication of a user;
receiving a selection of a persona style, wherein the selected persona style defines a communication style, the persona style one of a plurality of unique persona style stored in a persona repository, wherein the selected persona style maintains the meaning of a text string while adapting the text string to include an inherent mood, strength, and/or feeling based on the selected persona style and wherein according to the selected persona style, a text string may be dynamically modified to convey the desired style of expression;
presenting a plurality of substitute elements to the user, wherein default substitute element is compatible with a unique persona style, and at least one substitute element is compatible with the selected persona style, in response to a determination that the element of the original content of the written communication is incompatible with the selected persona style; and
modify the original content of the written communication to replace the element of the original content with the substitute element in response to a selection of the substitute element by the author.

15. The method of claim 14, further comprising:
storing a plurality of persona styles in a persona repository, wherein each persona style defines a unique communication style; and
selecting the persona style from the plurality of persona styles.

16. The method of claim 14, further comprising storing a set of rules in the persona repository, wherein the set of rules defines a modification process to modify the original content of the written communication to replace the element of the original content with the substitute element that is compatible with the selected persona style.

17. The method of claim 14, further comprising modifying the original content of the written communication according to a neutral persona style in response to a selection of the user to remain anonymous.

* * * * *